United States Patent Office 3,422,152
Patented Jan. 14, 1969

3,422,152
DIHALOGENATED ALKOXYDIPHENYL-IODONIUM SALTS

Leonard Doub, Bloomfield Hills, Mich., assignor to Parke, Davis & Company, Detroit, Mich., a corporation of Michigan No Drawing. Filed Jan. 5, 1966, Ser. No. 518,791
U.S. Cl. 260—612 7 Claims
Int. Cl. C07c 25/00; C07c 43/28

ABSTRACT OF THE DISCLOSURE

Dihalogenated(lower alkoxy)diphenyliodonium salts, useful as anthelmintic and antibacterial agents, and their production by (a) reacting a (lower alkoxy)benzene with a haloiodosobenzene or a haloiodosobenzene diacetate in the presence of an acid, and (b) reacting a monohalogenated(lower alkoxy)diphenyliodonium halide with chlorine or bromine.

Summary and detailed description

The present invention relates to new organic salt compounds and to methods for their production. More particularly, the invention relates to new dihalogenated(lower alkoxy)diphenyliodonium salts, having the formula,

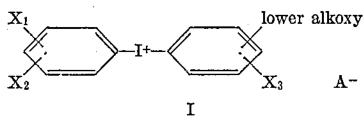

I where $X_1$ is fluorine, chlorine, or bromine; $X_2$ is hydrogen, fluorine, chlorine, or bromine; $X_3$ is hydrogen or halogen; and $A^-$ represents one equivalent of an anion; with the further proviso that $X_1$, $X_2$, and $X_3$ are selected to constitute one of the combinations selected from the groups consisting of B and C:

B $\begin{cases} X_1 = \text{fluorine, chlorine or bromine} \\ X_2 = \text{fluorine, chlorine or bromine} \\ X_3 = \text{hydrogen} \end{cases}$ C $\begin{cases} X_1 = \text{fluorine, chlorine or bromine} \\ X_2 = \text{hydrogen} \\ X_3 = \text{halogen} \end{cases}$ The lower alkoxy group shown in the foregoing formula is an alkoxy group containing not more than 4 carbon atoms.

In accordance with the invention, dihalogenated(lower alkoxy)diphenyliodonium salts having the foregoing formula are produced by reacting an iodine-containing compound, having the formula,

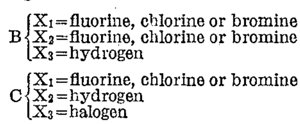

II with a (lower alkoxy)benzene compound, having the formula,

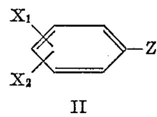

III in the presence of an acid; where Z represents IO or $I(OCOCH_3)_2$ and $X_1$, $X_2$, and $X_3$ have the same meaning as previously given. The reaction is normally carried out in a solvent, which is preferably glacial acetic acid. Other lower alkanoic acids, such as formic acid and propionic acid, may also be used as solvent. Acids that may be used in the reaction include sulfuric acid, phosphoric acid, formic acid, trichloroacetic acid, and trifluoroacetic acid. Of these, sulfuric acid is preferred. When the acid used is one of the foregoing organic acids, it can function also as solvent for the reaction, if used in substantial excess. In most instances, for rapid and complete reaction, it is desirable also to add acetic anhydride to the reaction mixture. Since the reaction is usually exothermic, external cooling is desirable, at least during the initial stage of the reaction. Hence, the most convenient and desirable way of carrying out the reaction is to cool a stirred mixture consisting of the selected starting material, the solvent, and, optionally, acetic anhydride to a temperature between 0° and 20° C. while the required amount of acid, preferably sulfuric acid, is added, and then to continue stirring the resulting mixture at room temperature until the reaction is complete. The completion of the reaction can readily be determined by testing a portion of the reaction mixture with starch iodide paper; a negative test result indicates that the reaction is essentially complete. The period required for completion of the reaction is not critical and may vary from 1–2 hours to 5 days or more. It is preferable to employ equivalent quantities of the organic starting materials, that is, the compounds having Formulas II and III above, although a slight excess of the (lower alkoxy)benzene compound would not be harmful.

The initial product of the reaction described in the foregoing is a dihalogenated (lower alkoxy)diphenyliodonium salt having Formula I above wherein $A^-$ is the anion derived from the acid used as catalyst for the reaction. This product may be isolated directly or, preferably, may be converted without isolation to other salts by metathetical reaction with a suitable inorganic salt, such as an alkali metal halide or an alkaline earth metal halide. For example, when the acid used is sulfuric acid, the initial product of the reaction is dihalogenated(lower alkoxy)diphenyliodonium bisulfate salt; this salt may be isolated directly or may be converted to another salt, for example a halide, by treatment of the reaction mixture with an alkali metal halide.

The iodine-containing starting materials required for use in the foregoing process, that is, the compounds having Formula II above, can be prepared in a number of ways. The iodosobenzene compounds, that is, the compounds of Formula II above where Z represents IO, can be prepared by first reacting the corresponding iodobenzene compounds with chlorine and then reacting the intermediate iodobenzene dichloride compounds with aqueous sodium hydroxide. The iodosobenzene diacetate compounds, that is, the compounds of Formula II where Z represents $I(OCOCH_3)_2$, are prepared by the reaction of the corresponding iodobenzene compounds with peracetic acid, as described in greater detail hereinafter.

Further in accordance with the invention, dihalogenated (lower alkoxy)diphenyliodonium halide salts, having the formula,

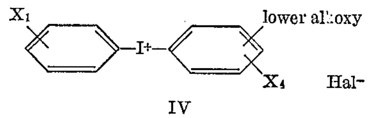

IV are produced by reacting a monohalogenated (lower alkoxy)-diphenyliodonium halide salt, having the formula,

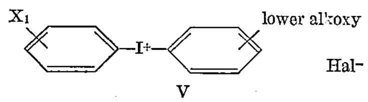

V with chlorine or bromine in an unreactive solvent medium; where $X_4$ is chlorine or bromine, $Hal^-$ is a chloride, bromide, or iodide ion, and $X_1$ has the aforementioned significance. Suitable solvents that may be used for the reaction include aliphatic ethers, halogenated hydrocarbons, lower alkanols, lower alkanoic acids, and nitrobenzene. Preferred solvents are chloroform and glacial acetic acid. The temperature and duration of the reaction are not critical and may be varied widely. It is most convenient to carry out the reaction at room temperature for a period that may vary from about 30 minutes to 5–6 hours. The reaction is usually complete when the evolution of hydrogen halide gas has subsided. When $Hal^-$ in Formula V above is an iodide anion, the initial product of the reaction is the poorly stable dihaloiodate salt. This salt is normally not isolated, but is converted to an ordinary halide salt by treatment of the reaction mixture with acetone or hot water.

The monohalogenated (lower alkoxy)diphenyliodonium halide salts, having Formula V above, that are used as starting materials in the foregoing process, are prepared by the method of the first process described above for the production of the dihalogenated (lower alkoxy) diphenyliodonium halide salts of the invention.

The dihalogenated (lower alkoxy)diphenyliodonium salts envisioned by and included in the present invention are those of Formula I wherein $A^-$ represents one equivalent of a pharmaceutically-acceptable anion. Some examples of such anions are the bisulfate, chloride, bromide, iodide, nitrate, acetate, citrate, succinate, benzoate, benzenesulfonate, and p-toluenesulfonate. As already mentioned above, these salts are prepared directly from the foregoing reactions or by metathesis. Some examples of metathetical reactions that may be used are the conversion of the bisulfate to the chloride by reaction with sodium chloride, the conversion of the chloride to the iodide by reaction with potassium iodide, and the conversion of the chloride to the acetate by reaction with silver acetate. Metathesis is the best method for the preparation of the relatively insoluble halide salts, which are the preferred salts of the invention because of their ease of preparation and isolation.

Another method for the preparation of the salts of the invention involves treating one of the halide salts with an equivalent amount of silver oxide in an aqueous medium, filtering the resulting mixture to remove the precipitated silver halide, and promptly neutralizing the basic filtrate, which contains a poorly stable dihalogenated (lower alkoxy)diphenyliodonium hydroxide, with an aqueous solution of an acid containing the anion desired for salt formation.

The compounds of the invention are new chemical compounds that are useful as pharmacological agents. They are anthelmintic agents that are active against *S. obvelata, H. nana,* and *H. diminuta.* As anthelmintic agents they are active upon oral administration. They are also antibacterial agents that are active in vitro against a number of strains of both gram-negative and gram-positive organisms, including the following: *Myco. tuberculosis, Prot. mirabilis, Strep. pyogenes,* and *Staph. aureus.*

The preferred compounds of the invention, because of their high degree of anthelmintic activity, are the (dihalophenyl)[p-(lower alkoxy)phenyl]iodonium salts, having the formula,

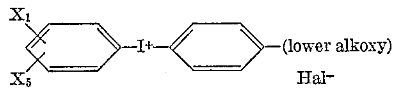

where $X_1$ and $X_5$ are the same and each is fluorine, chlorine, or bromine; and $Hal^-$ has the aforementioned significance.

The invention is illustrated by the following examples:

Example 1

A well-stirred mixture consisting of 19.55 g. of 3,5-dichloroiodosobenzene diacetate, 5.4 g. of anisole, 27.5 ml. of acetic anhydride, and 187.5 ml. of acetic acid is kept below 15° C. while 2.77 ml. of sulfuric acid is carefully added. The resulting mixture is stirred at 10° C. until a starch-iodide test is negative, and is then poured into an equal volume of ice water. After extraction with ether, the aqueous mixture, which contains (3,5-dichlorophenyl) (p-methoxyphenyl)iodonium bisulfate, is treated with a saturated aqueous sodium chloride solution, and the (3,5-dichlorophenyl)(p - methoxyphenyl)iodonium chloride that precipitates is isolated and purified by continuous extraction to remove impurities with methanol for two hours; M.P. 209–210° C.

(3,5 - dichlorophenyl)(p - methoxyphenyl)iodonium bisulfate may be isolated from the foregoing reaction by evaporating to dryness under reduced pressure the aqueous mixture obtained after the reaction mixture is poured into ice water and extracted with ether. This bisulfate salt, obtained as an oil, can be converted to the bromide salt as follows. The oily bisulfate salt (2 g.) is suspended in 50 ml. of water, the aqueous mixture is treated with a saturated aqueous solution of sodium bromide, and the (3,5 - dichlorophenyl)(p - methoxyphenyl)iodonium bromide that precipitates is isolated and purified by continuous extraction with methanol to remove impurities for several hours.

The (3,5-dichlorophenyl)(p-methoxyphenyl)-iodonium chloride, obtained as described above, is converted to the acetate salt by the following procedure. The chloride salt (2–3 g.) is suspended in 50 ml. of water, and the aqueous mixture is treated with an equivalent amount of silver oxide. The resulting mixture is filtered, the basic filtrate, containing (3,5 - dichlorophenyl)(p - methoxyphenyl)iodonium hydroxide, is neutralized with acetic acid, and the neutral solution is evaporated to dryness under reduced pressure to give (3,5-dichlorophenyl)(p-methoxyphenyl) iodonium acetate.

The 3,5-dichloroiodosobenzene diacetate that is used as a starting material in the foregoing procedure is prepared as follows. To a stirred solution of 144 g. of 3,5-dichloroiodobenzene in 400 ml. of glacial acetic acid at 40° C. is added 190 ml. of 40% peracetic acid in 10–25 ml. portions. The resulting mixture is kept at room temperature overnight, and the solid precipitate of 3,5-dichloroiodosobenzene diacetate that is obtained is isolated and purified by extensive extraction with ether to remove color; M.P. 197–198° C.

Example 2

A well-stirred mixture consisting of 7.82 g. of 2,4-dichloroiodosobenzene diacetate, 2.16 ml. of anisole, 18 ml. of acetic anhydride, and 85 ml. of acetic acid is kept below 15° C. while 1.11 ml. of sulfuric acid is added. The resulting mixture is stirred at 10° C. until a starch-iodide test is negative, and is then poured into 100 ml. of ice water. After extraction with ether, the aqueous mixture, which contains (2,41dichlorophenyl)(p-methoxyphenyl) iodonium bisulfate, is treated with 200 ml. of saturated aqueous sodium chloride, and the gummy precipitate of (2,4 - dichlorophenyl)(p - methoxyphenyl)iodonium chloride that is obtained is isolated and purified by trituration with ether and crystallization from ethanol; M.P. 180–181° C.

(2,4-dichlorophenyl)(p-methoxyphenyl)iodonium iodide is obtained as follows. A solution of 5 g. of the finely divided chloride salt in 50 ml. of dimethylsulfoxide is added to a solution of 2 g. of potassium iodide in 100 ml. of water. The precipitate obtained is isolated and added to a stirred solution of 1 g. of potassium iodide in 100 ml. of water. After thorough stirring, the solid precipitate, which is the desired (2,4-dichlorophenyl)(p-methoxyphenyl)iodonium iodide, is isolated, washed with water and dried.

By utilizing the procedure described above, the following dihalogenated (lower alkoxy)diphenyliodonium chloride salts are obtained from the reaction of the designated (lower alkoxy)benzene compound and halogenated iodosobenzene diacetate.

(a) From the reaction of 2,5-dichloroiodosobenzene diacetate and anisole there is obtained (2,5-dichlorophenyl)(p-methoxyphenyl)iodonium chloride; M.P. 225° C. (with decomposition).

(b) From the reaction of 3,5-difluoroiodosobenzene diacetate and anisole there is obtained (3,5-difluorophenyl)(p-methoxyphenyl)iodonium chloride; M.P. 194–195° C., following crystallization from ethanol.

(c) From the reaction of 3,5-dichloroiodosobenzene diacetate and phenetole there is obtained (3,5-dichlorophenyl)(p-ethoxyphenyl)iodonium chloride; M.P. 197–198° C.

(d) From the reaction of 3,5-dichloroiodosobenzene diacetate and butyl phenyl ether there is obtained (3,5-dichlorophenyl)[p-(n-butoxy)phenyl]-iodonium chloride; M.P. 171–172° C.

The 2,4-dichloroiodosobenzene diacetate used as a starting material in the foregoing procedure is prepared as follows. To a stirred solution of 30 g. of 2,4-dichloroiodobenzene in 25 ml. glacial acetic acid is added 43.7 ml. of peracetic acid in small portions over a period of 3 hours while the temperature is kept below 40° C. The mixture is then stirred for an additional 90 minutes, cooled to 10° C., and diluted with water to 300 ml. The solid 2,4-dichloroiodosobenzene diacetate that precipitates is isolated, washed with water and ether, and dried; M.P. 155–161° C.

In a similar manner, 3,5-difluoroiodosobenzene diacetate, M.P. 125–131° C., following crystallization from 50% acetic acid, is obtained from the reaction of 5 g. of 3,5-difluoroiodobenzene and 9.49 g. of 40% peracetic acid.

Example 3

A stirred mixture consisting of 35.8 g. of m-chloroiodosobenzene diacetate, 14.2 g. of p-choloroanisole, 25 ml. of acetic anhydride, and 250 ml. of acetic acid is kept below 15° C. while 20 ml. of sulfuric acid is carefully added. The resulting mixture is kept at room temperature overnight or until a starch-iodide test is negative, and is then treated with a saturated aqueous sodium chloride solution. The (m-chlorophenyl)(2-methoxy-5-chlorophenyl)iodonium chloride that precipitates is isolated and crystallized from 60% ethanol; M.P. 182–183° C.

In the foregoing procedure, the same product is obtained when 25 ml. of phosphoric acid is substituted for the sulfuric acid.

By utilizing the foregoing procedure, the following salts are obtained from the reaction of m-chloroiodosobenzene diacetate with the designated (lower alkoxy)-benzene compound.

(a) From reaction with o-bromoanisole there is obtained (m-chlorophenyl)(3-bromo - 4 - methoxyphenyl)iodonium chloride; M.P. 203–204° C., following crystallization from dimethylsulfoxide.

(b) From reaction with p-bromoanisole there is obtained (m-chlorophenyl)(2-methoxy - 5 - bromophenyl)iodonium chloride; M.P. 160–162° C., following crystallization from 50% ethanol.

Example 4

To a stirred mixture consisting of 17.8 g. of m-chloroiodosobenzene diacetate, 6.3 g. of p-fluoroanisole, 27.5 ml. of acetic anhydride, and 187 ml. of acetic acid is kept at a temperature below 15° C. while 12.5 ml. of sulfuric acid is carefully added. The resulting mixture is stirred for 30 minutes more at room temperature or until a starch-iodide test is negative, poured into 200 ml. of iced water, and the aqueous mixture is treated with 250 ml. of saturated aqueous sodium chloride solution. The (m-chlorophenyl)(2-methoxy - 5 - fluorophenyl)iodonium chloride that precipitates is isolated and crystallized from 50% ethanol; M.P. 170° C.

In the foregoing procedure, the same product is obtained when 12.7 g. of m-chloroiodosobenzene is substituted for the m-chloroiodosobenzene diacetate.

By utilizing the foregoing procedure with the modifications indicated below, the following salts are obtained from the reaction of the designated halogenated iodosobenzene diacetate and (lower alkoxy)benzene compound.

(a) From the reaction of m-chloroiodosobenzene diacetate and o-iodoanisole in the presence of 5 ml. of sulfuric acid, there is obtained (m-chlorophenyl)-(3-iodo-4-methoxyphenyl)iodonium chloride; M.P. 198° C., following crystallization from 50% ethanol.

(b) From the reaction of m-chloroiodosobenzene diacetate and o-iodophenetole in the presence of 2 ml. of sulfuric acid, there is obtained (m-chlorophenyl)-(3-iodo-4-ethoxyphenyl)iodonium chloride, initially obtained as a tar that solidifies upon trituration with ether; M.P. 171–173° C., following washing with water and ether and crystallization from 50% ethanol.

(c) From the reaction of m-bromoiodosobenzene diacetate and p-bromoanisole there is obtained (m-bromophenyl)(2 - methoxy-5-bromophenyl)iodonium chloride, initially obtained as a gum that solidifies upon standing; M.P. 161–163° C., following purification by washing with water and ether.

(d) From the reaction of m-fluoroiodosobenzene diacetate and o-chlorophenetole in the presence of 5 ml. of sulfuric acid, there is obtained (m-fluorophenyl)-(3-chloro-4-ethoxyphenyl)iodonium chloride; M.P. 196–197° C., following crystallization from 50% ethanol.

(e) From the reaction of m-fluoroiodosobenzene diacetate and o-bromoanisole, allowing the reaction mixture to stand overnight at room temperature following the addition of the sulfuric acid, there is obtained (m-fluorophenyl)(3-bromo-4-methoxyphenyl)iodonium chloride; M.P. 207° C.

(f) From the reaction of m-fluoroiodosobenzene diacetate and p-bromoanisole, allowing the reaction mixture to stand overnight at room temperature following the addition of the sulfuric acid (25 ml.), there is obtained (m-fluorophenyl)(2-methoxy-5-bromophenyl)iodonium chloride; M.P. 178° C.

(g) From the reaction of m-fluoroiodosobenzene diacetate and p-fluoroanisole, modified as described in (f) above, there is obtained (m-fluorophenyl)(2-methoxy-5-fluorophenyl)iodonium chloride; M.P. 174° C., following crystallization from water.

(h) From the reaction of o-chloroiodosobenzene diacetate, combined with one-half mole of acetic acid, and o-chlorophenetole, there is obtained (o-chlorophenyl)-(3-chloro-4-ethoxyphenyl)iodonium chloride; M.P. 180° C., following purification by washing with 200 ml. of water and crystallization from 50% ethanol.

(i) From the reaction of o-chloroiodosobenzene diacetate, combined with one-half mole of acetic acid, and p-bromoanisole in the presence of 15.6 ml. of sulfuric acid, there is obtained (o-chlorophenyl)(2-methoxy-5-bromophenyl)iodonium chloride; M.P. 174° C.

Example 5

A stirred mixture consisting of 20.05 g. of 3-bromoiodosobenzene diacetate, 6.4 ml. of o-bromoanisole, 27.5 ml. of acetic anhydride, and 187.5 ml. of acetic acid is kept at 10° C. while 2.5 ml. of sulfuric acid is added, and the resulting mixture is stirred at 10° C. until a starch-iodide test is negative. The solution is then poured into 250 ml. of iced water, the aqueous mixture is extracted with ether, and the ether extracts are discarded. Treatment of the aqueous mixture with 250 ml. of saturated aqueous sodium chloride results in the precipitation of (m-bromophenyl)(3-bromo-4-methoxyphenyl)iodonium chloride, which is isolated, washed with ethanol, and crystallized from 50% ethanol; M.P. 192° C.

In the foregoing procedure, the same product is obtained when 250 ml. of 100% formic acid is substituted for the acetic anhydride, acetic acid, and sulfuric acid, and the reaction mixture is stirred at room temperature instead of 10° C.

By utilizing the foregoing procedure, the following halogenated (lower alkoxy)diphenyliodonium chloride salts are obtained from the reaction of the designated halogenated iodosobenzene diacetate and (lower alkoxy) benzene compound.

(a) From the reaction of m-fluoroiodosobenzene diacetate and o-iodophenetole there is obtained (m-fluorophenyl)(3-iodo-4-ethoxyphenyl)iodonium chloride; M.P. 183° C., following crystallization from 50% ethanol.

(b) From the reaction of o-bromoiodosobenzene diacetate and o-bromoanisole there is obtained (o-bromophenyl)(3-bromo-4-methoxyphenyl)iodonium chloride; M.P. 174° C., following crystallization from 50% ethanol.

(c) From the reaction of o-bromoiodosobenzene diacetate and p-bromoanisole there is obtained (o-bromophenyl)(2-methoxy-5-bromophenyl)iodonium chloride; M.P. 179° C., following crystallization from 50% ethanol.

(d) From the reaction of p-bromoiodosobenzene diacetate and o-fluoroanisole there is obtained (p-bromophenyl)(3-fluoro-4-methoxyphenyl)iodonium chloride; M.P. 201–202° C.

The halogenated iodosobenzene diacetate compounds that are used as starting materials in the procedure of this example and in the procedures of Example 4 above are prepared by the reaction of the corresponding halogenated iodobenzene compounds and 40% peracetic acid, following the procedure described in Example 1 above for the preparation of 3,5-dichloroiodosobenzene diacetate. Thus, for example, from the reaction of 210 g. of m-fluoroiodobenzene and 400 ml. of 40% peracetic acid, there is obtained m-fluoroiodosobenzene diacetate; M.P. 145–149° C., following purification by extraction into chloroform, filtration of the chloroform solution, and evaporation of the filtrate.

Example 6

A stirred mixture consisting of 2.22 g. of 2,6-dibromoiodosobenzene, 1.27 ml. of anisole, 3 ml. of acetic anhydride, and 18 ml. of acetic acid is kept below 15° C., while 0.22 ml. of sulfuric acid is added. The resulting mixture is then stirred at room temperature until a starch-iodide test is negative and is then poured into 100 ml. of water. After extraction with 25 ml. of ether, the aqueous mixture is treated with 50 ml. of saturated aqueous sodium chloride, and the (2,6-dibromophenyl)(p-methoxyphenyl)iodonium chloride that precipitates is isolated, washed with ether, and crystallized twice from ethanol; M.P. 174–175° C.

Example 7

A mixture consisting of 23.63 g. of (m-chlorophenyl)(p-methoxyphenyl)iodonium iodide and 460 ml. of dry chloroform is stirred at room temperature for 2.75 hours while dry chlorine gas is bubbled into it. It is then treated with 25 ml. of acetone and the (m-chlorophenyl)(3-chloro-4-methoxyphenyl)iodonium chloride that precipitates is isolated and crystallized from 50% ethanol; M.P. 202.5–203° C.

By utilizing the foregoing procedure, with the substitution of 25 g. of (m-fluorophenyl)(p-ethoxyphenyl)-iodonium iodide for the (m-chlorophenyl)(p-methoxyphenyl)iodonium iodide, there is obtained (m-fluorophenyl)(3-chloro-4-ethoxyphenyl)iodonium chloride; M.P. 196–197° C., following crystallization from 50% ethanol.

The preparation of the starting materials used in the foregoing procedure can be exemplified by the preparation of (m-chlorophenyl)(p-methoxyphenyl)iodonium iodide as follows: To a well-stirred mixture consisting of 57.0 g. of m-chloroiodosobenzene, 24.4 ml. of anisole, 125 ml. of acetic anhydride, and 950 ml. of acetic acid, kept at a temperature below 15° C., is added dropwise 50 ml. of sulfuric acid. After 30 minutes of stirring at room temperature, the resulting mixture is poured into a solution of 75 g. of sodium iodide in 200 ml. of water, and the (m-chlorophenyl)(p-methoxyphenyl)iodonium iodide that precipitates is isolated and washed with water and with ether; M.P. 146–147° C.

Example 8

To a stirred mixture consisting of 9.4 g. of (m-chlorophenyl)(p-methoxyphenyl)iodonium iodide and 200 ml. of glacial acetic acid is slowly added a solution of 3.2 g. of bromine in 100 ml. of glacial acetic acid, and the resulting mixture is stirred at room temperature for 3 hours. It is then treated with 25 ml. of acetone and 100 ml. of water and the solid (m-chlorophenyl)(3-bromo-4-methoxyphenyl)iodonium bromide obtained is isolated, dried and crystallized from aqueous ethanol.

I claim:

1. A dihalogenated (lower alkoxy)diphenyl-iodonium salt, having the formula,

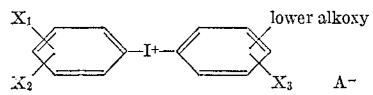

where $X_1$ is a member of the class consisting of fluorine, chlorine, and bromine; $X_2$ is a member of the class consisting of hydrogen, fluorine, chlorine, and bromine; $X_3$ is a member of the class consisting of hydrogen and halogen; $A^-$ represents one equivalent of a pharmaceutically-acceptable anion; with the proviso that $X_1$, $X_2$, and $X_3$ are selected to constitute one of the combinations selected from the groupings consisting of B and C:

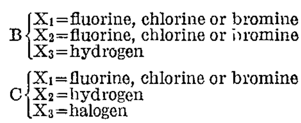

2. A salt according to claim 1 wherein $A^-$ represents one equivalent of a halide ion.

3. A salt according to claim 1 which is (3,5-dichlorophenyl)(p-methoxyphenyl)iodonium chloride.

4. A salt according to claim 1 which is (m-chlorophenyl)(3-bromo-4-methoxyphenyl)iodonium chloride.

5. A salt according to claim 1 which is (m-chlorophenyl)(3-chloro-4-methoxyphenyl)iodonium chloride.

6. A salt according to claim 1 which is (m-fluorophenyl)(2-methoxy-5-bromophenyl)iodonium chloride.

7. A salt according to claim 1 which is (o-bromophenyl)(3-bromo-4-methoxyphenyl)iodonium chloride.

References Cited

UNITED STATES PATENTS 2,878,293 3/1959 Kinser ............ 260—350

OTHER REFERENCES

Beringer et al.: Jour. Amer. Chem. Soc., vol. 81 (1959), pages 342–351.

Caserio et al.: Jour Amer. Chem. Soc., vol. 81 (1959), pages 336–342.

BERNARD HELFIN, *Primary Examiner.*

U.S. Cl. X.R.

260—350, 476, 505, 535, 537, 541, 607, 999